June 16, 1959  F. FAULHABER  2,890,637
RELEASE SYSTEM FOR PHOTOGRAPHIC CAMERAS
Filed June 24, 1952  3 Sheets-Sheet 1
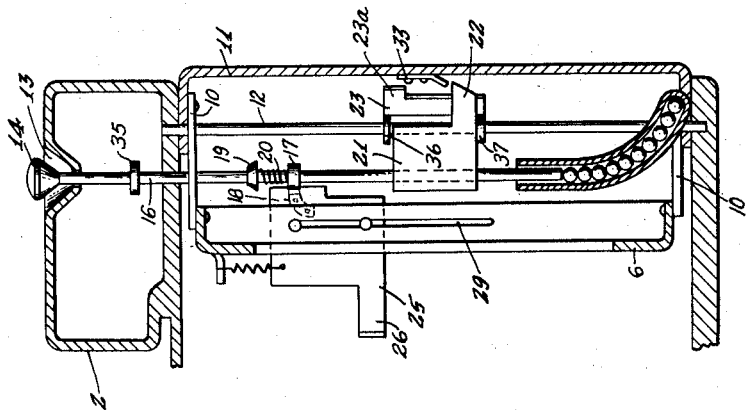
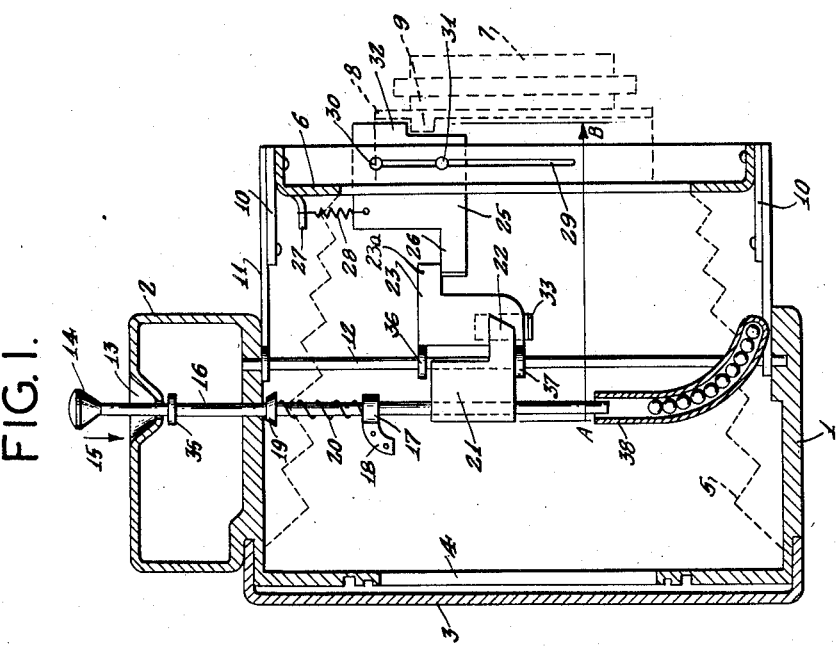
INVENTOR.
FRITZ FAULHABER
BY
Mosk & Blum
ATTORNEYS.

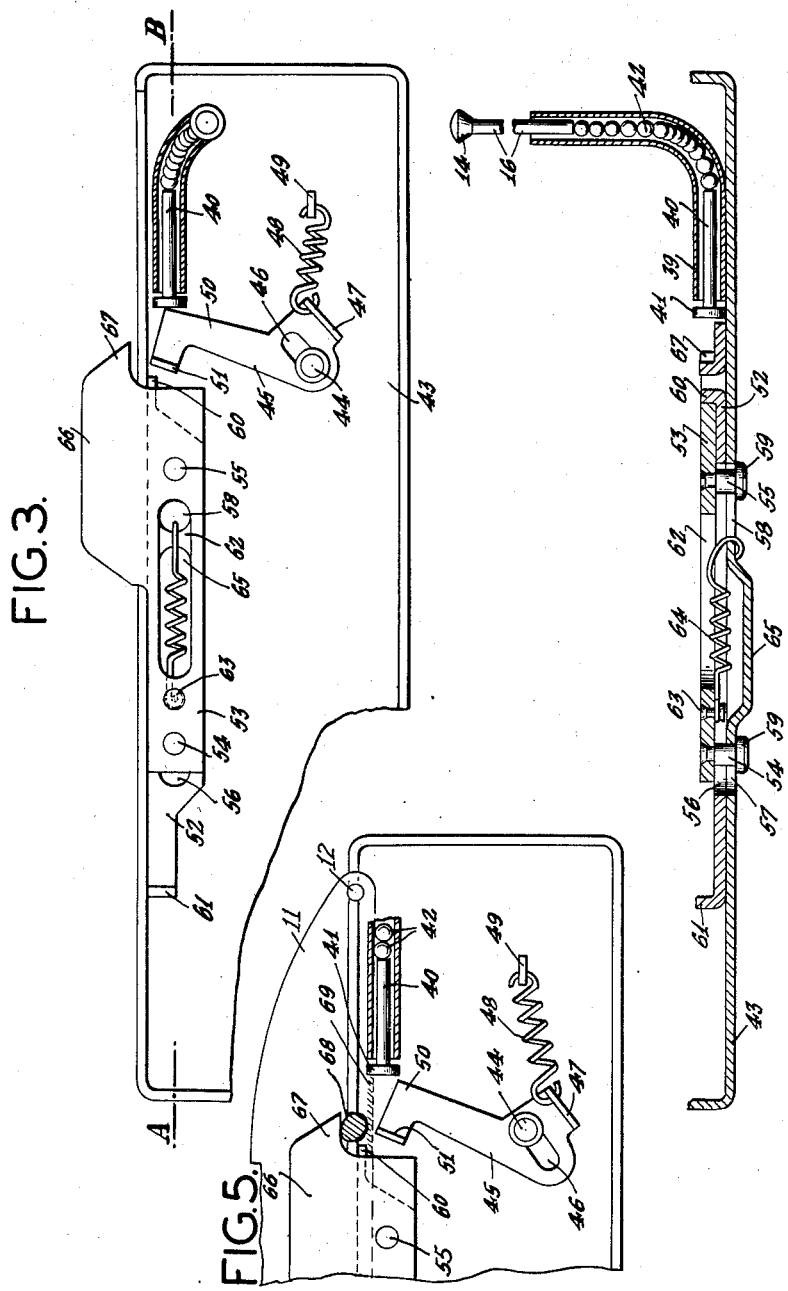

June 16, 1959 F. FAULHABER 2,890,637
RELEASE SYSTEM FOR PHOTOGRAPHIC CAMERAS
Filed June 24, 1952 3 Sheets-Sheet 3

INVENTOR
FRITZ FAULHABER
BY Mock & Blum
ATTORNEYS.

United States Patent Office 2,890,637
Patented June 16, 1959

2,890,637
RELEASE SYSTEM FOR PHOTOGRAPHIC CAMERAS

Fritz Faulhaber, Schonaich, Bezirk Boblingen, Wurttemberg, Germany, assignor to Voigtlander, A.G., Braunschweig, Germany, a corporation of Germany Application June 24, 1952, Serial No. 295,177
Claims priority, application Germany July 14, 1951
5 Claims. (Cl. 95—32)

This invention relates to a new and improved release system for photographic cameras.

In my prior Patent No. 2,713,293, issued on July 19, 1955, I described and claimed a release key, in which the stroke of the same contact pin of the release key serves different functions in closed position of the camera and in the open, ready for exposure position of the camera, respectively. According to the invention described in said prior patent, the release key—in addition to the conventional, simultaneous actuation of shutter release and of double exposure prevention—has a further function, i.e. the release of the locking means of the closed camera cover, so that the closed camera can be opened by applying pressure to the release key. In the actuation by the same contact pin of several members for different camera functions, these members were spatially separated, and this required the use of separate bearing and guide means and the use of several return springs and the like. This is a disadvantage in photographic cameras, in which economical utilization of space, relatively low number of the parts and elimination of expensive precision manufacture steps, are essential.

The main object of the present invention is the improvement of release keys of the above mentioned type by using common bearing and guide means for at least two transmission members for effecting or releasing different camera functions, in such manner that the pressing movement of the release key is alternately transmitted to them, depending on whether the camera is open or closed. Other objects will be apparent from the following specification and the appended drawings.

The drive, which may be necessary for holding said members in an end position, consists according to the invention of a common power member or drive member, for example a spring which can act on all members. The members, which are preferably designed as slides lying one upon another, are engaged, for separate or individual displacement, either directly by the release key or by an intermediate member, while for simultaneously displacement, the members not directly engaged are carried along by a driving member, for example an adjacent organ thereof, receiving the drive, by means of projections, or the like. Selection of individual or simultaneous actuation of said members can be effected by the camera cover, which may cause displacement of the release key or of the intermediate member transmitting the drive, by its closing or opening movement. According to a preferred embodiment, the intermediate means for transmitting the drive, consists of a lever which can be caused by the release key to swing, is capable of changing its position relative to its pivot and is preferably under spring action. This lever has different positions in the open and closed camera and, depending on its position, is capable of engaging different organs. For locking the camera cover and actuation of the film winding lock, two flat slides lying one upon the other and having common guide means, on the bottom of the camera and both urged by the same spring in the direction of the closing movement, can be, for example, used. Thereby the cover lock bears against a projection of the film transport lock slide, said projection being directed toward the locking hook and release key and having only a fraction of the width of the slide. Thus, in open position of the camera, pressure of the key or of the intermediate member is applied to said projection and, therefore, to both slides, while in closed position of the camera the pressure acts on one slide only. In order to avoid the necessity of using extensive transmission members, such as levers or the like, for transmitting the pressure from the control key to the elements to be displaced, it has been found of advantage to use conventional guided, flexible members or members movable in themselves, for example a Bowden control cable. I prefer the use of a transmission consisting of a series of balls inserted in a tube between the control knob and the end member of the release key. Upon applying pressure to said knob, the balls in the tube are displaced. The guide tube for the balls can be bent and can extend from the release key to the place where actuation takes place, so that the use of intermediate members, such as levers, is unnecessary.

The appended drawings show, by way of example, an embodiment of the invention, to which the invention is not limited. Parts which are not necessary for understanding the invention, are not shown in the drawings.

Figure 1 is a diagrammatical, sectional view of an open camera, showing the arrangement of the release key according to the invention;

Figure 2 shows the camera illustrated in Figure 1, the camera cover being closed and the key depressed;

Figure 3 is a top view of the interior surface of the bottom of the camera and the individual parts actuated by the release key;

Figure 4 is a sectional view along line A—B of the parts shown in Fig. 3;

Figure 5 illustrates the right part of Fig. 3 in top view in another position of the actuating lever;

Figure 6:
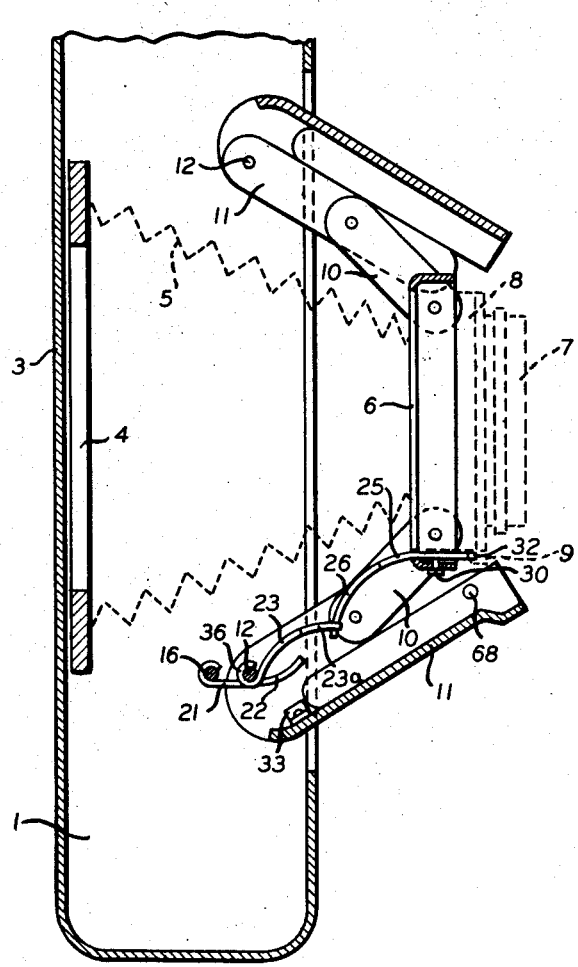
Fig. 6 illustrates in top plan view of the open camera the position of parts which provide for connection between the release key and the release lever of the shutter.

Referring now to the drawings in detail, in Figure 1 reference numeral 1 denotes the camera body, to which top cover part 2 is fastened. The back side of the camera is provided, as shown also in Figs. 6 and 7, with a removable rear wall 3, picture window 4 being located behind wall 3. Reference numeral 5 denotes the bellows of the camera. Objective 7 provided with shutter 8 is arranged on objective board 6. The release lever of shutter 8 is indicated at 9. Objective board 6 is held by struts 10 on folding cover 11, which is capable of swinging about axis 12. The camera belongs to the type of folding cameras, in which a spring arrangement not shown permanently tends to swing board 11 to the open position. This open position of the camera is illustrated in Figs. 1 and 6. Top cover part 2 is provided with a recess 13, into which release key 14 can be depressed by hand in the direction of arrow 15. Knob-like part 14 of the key is connected with contact pin 16, which is guided by eye 17 of a bearing 118 fastened to the camera body. Pin 16 carries member 19 and is encircled between the latter and eye 17 by a helical spring 20. This spring permanently urges release key 14 to the withdrawn or projecting position. Furthermore, a transmission member 21 is fastened to pin 16. Member 21 has a nose 22, the function of which will be explained further below. By its upper edge and lower edge, transmission member 21 projects between eyes 36 and 37 of an intermediate slide member, or the like, 23, the latter being guided by said eyes 36 and 37 on hinge rod 12. In this manner, the two members 21 and 23, owing to their design, are permanently in engagement, whereby, for example by means, not shown in detail, connecting it to cover 11, said intermediate slide member 23 is caused to swing about axis 12 together with folding cover 11 when the latter is folded to closed position, as shown in Figure 2.

Figure 7:
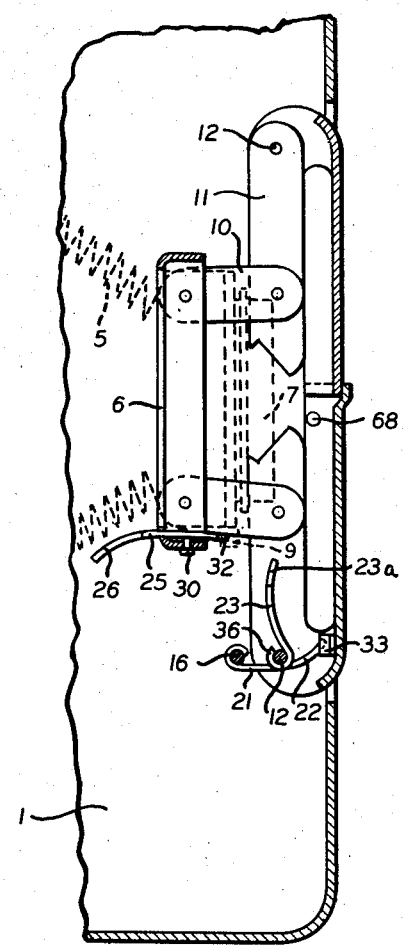
Fig. 7 shows in top plan view of the closed camera the position of the connecting parts illustrated in Fig. 6.

Thus member 23 does not hinder closing of cover 11. Over this member 23, in open position of the camera, movement of transmission member 21 is transmitted to the last element of the release gear train, i.e. release slide 25. The latter has a projecting nose-like part 26 which bears against a corresponding projection 23a of member 23. This positive engagement is brought about by tension spring 28 which is fastened at 27 to board 6 at one end, and to release slide 25 at the other end. Said slide is guided in a straight line by means of longitudinal slot 29 and studs 30 and 31. Stud 30 is connected to release slide 25 and serves as a stop limiting the movement brought about by spring 28. Release slide 25 is provided with a rudimentary nose-like projection 32 which comes in engagement on the outside with release lever 9 of shutter 8, when release key 14 is actuated in the direction of arrow 15. The mechanism of transmission can be easily understood from Figures 1 and 6. As will be best seen from Fig. 6, in the position of the camera ready for picture-taking as shown in the drawing, parts 21, 23 and 25 form a bridge between the release key 14 and the release lever 9 of the shutter 8. In this position of the parts 21, 23 and 25, pressure exerted on the release key 14 is transmitted to the release lever 9. If the camera is brought from the picture-taking position shown in Figs. 1 and 6 into the rest position shown in Figs. 2 and 7, the following takes place as far as structural parts 21, 23 and 25 are concerned: Upon pressing the objective board 6 into the camera body 1, first the nose 26 of release slide 25 is released from nose 23a of the intermediate slide 23. The release slide 25 which is displaceably seated on the objective board 6, moves simultaneously with the latter into the camera body, while the intermediate slide 23 is taken along by the swinging movement of the cover 11 about axis 12, by this cover, to its rest position shown in Figs. 2 and 7. The bridge formed by parts 21, 23 and 25 is thereby broken so that pressing down of release key 14 has now no effect on release lever 9. Upon further pressing the objective board 6, the latter moves together with release slide 25 to the camera body 1. The closing cover 11 causes swinging of the intermediate slide 23 to a position transversely relative to the optical axis, as can be seen in Fig. 7. A spring, or the like, 33 is fastened to cover 11 and this spring 33 is moved into the path of nose 22 of transmission member 21, when the camera is closed. If now in closed position of the camera, key 14 is pressed downward in the direction of arrow 15, transmission member 21 is likewise moved downward and slides to the position shown in Figure 2 under the bent portion of spring 33, so that key 14 is locked in its depressed position. In closed position of the camera, key 14 does not substantially protrude beyond the outer surface of the camera.

Upon opening the camera, together with objective board 6, which emerges from camera body 1, release slide 25 is also moved. Intermediate slide 23 will likewise swing together with the cover 11 which opens then. The slides 23 and 25 come together again in engagement with each other so that the connection between release key 14 and release lever 9 is restored again.

In the device according to the present invention, in addition to the release of the shutter by the release key in open position of the camera, and in addition to the step of unlocking the film wind, which is likewise brought about by the release key, the latter is capable also of unlocking the cover in closed position of the camera. It will be understood from Figures 1, 2, 3, and 4, that the lower free end of rod 16 of release key 14, enters the interior of a bent tube 38. As best shown in Figure 4, tube 38, which is fastened to the bottom of camera 1, is bent in such manner that its lower straight end portion 39 is parallel with, and rests on the bottom of the camera body. Said straight end portion 39 serves as a guide or bearing for a ram 40, which is displaceable in said end portion 39 and provided with an outwardly projecting pressure plate 41. Behind said ram 40, balls 42 are inserted in tube 38, which fill the tube to such level that rod 16 of release key 14 is just in contact with the uppermost ball, when camera 1 is closed and release key 14 is in rest position, i.e. in inserted, but not depressed position in the interior of the camera. In open position of the camera when the release key is in outwardly advanced position, there is a certain intermediate space left between the end of contact rod 16 and the uppermost ball.

Figures 3, 4 and 5 illustrate the parts necessary for unlocking the camera cover and releasing the film transport lock. These parts are actuated by the release key and a lever-like intermediate member. A lever 45 is pivotably connected to bolt 44 which is fastened to bottom 43 of the camera, said lever having a longitudinal slot 46, which receives bolt 44. At a bent portion 47, lever 45 is engaged by a draw spring 48, the other end of which is connected to a ring, or the like, 49 fastened to the bottom of the camera. Said spring 48 acts on lever 45 in such manner that longer end 50 of lever 45 is pressed against plate 41 of ram 40. The other end 51 of lever 45 is bent in a right angle and serves as a pressure surface. In the direction of movement of ram 40 and opposite to bent end 51 of said lever, two elongated, flat slides 52 and 53, lying one upon another are arranged on bottom 43 of the camera. To the upper slide 53, two bolts 54, 55, are fastened, which pass through a slot 56 of lower slide 52 and through two slots 57, 58, of camera bottom 43 and hold said slides there by means of their collars 59, 59. Slides 52, 53 are thus individually or together displaceable relative to the bottom of the camera. Lower slide 52 is narrower at both ends and its end portions are bent upward in a right angle, so that they form stop surfaces 60, 61. Upper slide 53 has an elongated opening 62, which partly coincides with opening 56 of lower slide 52. Below these openings or slots, camera bottom 43 is provided with a depression 65. A draw spring 64 is located in said recesses and in depression or cavity 65. One end of spring 65 is fastened to bolt 63 of the upper slide, while its other end engages the camera bottom through slot 58. Thus, spring 64 draws upper slide 53 to the right in the drawing, in the direction of release ram 40 and stop surface 51 of lever 45. As lower slide 52 has a bent end portion 60, which is pressed by upper slide 53 owing to the action of spring 64, both slides will be permanently urged to the right in the drawing. The left bent end portion 61 of lower slide 52 acts on members of the double exposure preventing means, which are not shown, because their illustration is not necessary for understanding the present invention. The right end of upper slide 53 is widened in transverse direction, and forms projection 66, which has a hook 67 adapted to lock the camera cover. For this purpose a bolt 68 or the like is provided on the camera cover 11.

The device shown in Figures 3, 4 and 5 operates as follows.

If the camera is closed (Figure 5) the arched cover of the camera lies against the camera, and its edge, which is indicated by dotted line 69, presses lever 45 into the camera, i.e. to the position shown in Figure 5, owing to the presence of elongated opening 46, which surrounds bolt 44. Hook 68 fastened to the camera cover, is blocked by hook 67 of slide 53 and the camera cover is thus held in closed position. In order to open the camera, pressure must be applied to knob 14 (see Figure 2), which is immerged in the camera. Knob 14 and the key connected therewith can be further depressed to a certain extent into recess 13, and this movement is transmitted over balls 42 to ram 40 and discs 41. The latter acts on part 50 of lever 45, and causes swinging of said lever. Thereby, bent portion 51 engages upper slide 53 and presses the latter backward against the tension of spring 64, so that hook 67 is removed from its engagement with hook 68 of the cover and thus releases the cover. The cover automatically snaps to open position under the action of a conventional spring arrangement. Upon this opening of the cover, lever 45 is drawn outward by its spring 48, because edge 69, which moves backward during opening of the cover, releases it in forward direction. Lever 45 is then in the position shown in Fig. 3, i.e. its bent up portion 51 is now opposite to bent up portion 60 of lower slide 52. Upon opening the camera, locking member 33 of the camera cover, releases nose or projection 22 of member 21 of contact rod 16, and, under the action of the spring 20, key 16 is moved upward and caused to emerge from the camera, as shown in Figure 1. If now, in taking a picture, key 14 is depressed, release of the shutter is brought about in the above described manner, over intermediate members 21, 23, 25. After release of the shutter, the end of rod 16 comes in contact with balls 42. Thus, upon further application of pressure to key 14, movement is again transmitted over the balls to ram 40 and by the latter to lever 45. Lever 45 swings to the left and presses now by means of its bent portion 51 against bent portion 60 of lower slide 52, movement of which releases the film transport lock at the left end of the slide. Thereby, upper slide 53 is carried along by bent portion 60, although it has no function to perform when the cover is in open position. This additional movement does not require the exertion of force, because, owing to the design of the two slides, spring 64 acts on both members 52 and 53.

The film transport lock, which is operated by lower slide 52 upon release of the shutter, may be a conventional structure, e.g. the structure described in U.S. Patent No. 1,360,538 to Kroedel. Said lower slide 52 provided with bent part 61 corresponds in said U.S. Patent 1,360,- 538 to slide 35 which is provided with ear 36 and releases the lock for the film transport when said slide 35 is displaced upon shutter release.

It will be understood that this invention is not limited to the specific means, constructions, steps, or the like, described above, and can be carried out with various modifications without departing from the scope of the invention as defined in the appended claims.

What is claimed is:

1. A release system of the type described, in a photographic camera provided with an objective and objective board, a releasable objective shutter, a film wind lock, a cover having a cover lock and being adapted to swing about a shaft to an open, ready for exposure position and to be folded about said shaft to a closed position and a release key provided with a release pin, for actuating the shutter release, and the cover lock; the release pin extending through an opening in the camera wall into the interior of the camera, being adapted to be depressed from an initial outward projecting position into the interior of the camera and to return under spring effect to its initial position, and carrying a first transmission member which is fixedly connected to the release pin in the interior of the camera and has a nose; an intermediate transmission member having two spaced eyes, being guided by said eyes along the shaft of the camera cover, engaging said first transmission member between said eyes and being likewise provided with a nose; a third transmission member provided with means for guiding the same in a direction parallel with said release pin and said shaft and having a nose for engaging under spring effect the nose of the intermediate transmission member and a projection for engaging the release lever of the shutter; depression of the release key in open condition of the camera causing simultaneous displacement of said first, intermediate and third transmission members and release of the shutter.

2. A release system as claimed in claim 1, in which the nose of the third transmission member which is slidably seated on the objective board, becomes disengaged from the nose of the intermediate transmission member upon retraction of the objective board and swinging of the camera cover toward the interior of the camera.

3. A release system as claimed in claim 2, in which the camera cover is provided with a lock adapted to engage the nose of the first transmission member and thus lock the release pin upon depression of the release pin to which said first transmission member is fastened, upon folding the cover of the camera.

4. A release system as claimed in claim 3, comprising a tube member fastened to the bottom of the camera and bent substantially in a right angle, the lower straight portion of said tube resting on the bottom of the camera body and serving as a bearing for a ram member having an outwardly projecting pressure plate, the tube portion forming a right angle with said lower portion being adapted to receive the lower end of the release pin and containing balls behind said ram up to such level that in open position of the camera and outwardly advanced position of the release key, there is intermediate space left between the lower end of the release pin and the uppermost ball, while in closed position of the camera, when the release key is in rest position, the lower end of the release pin is just in contact with the uppermost ball; a two-armed lever provided with a longitudinal slot and pivoted about a bolt which is stationary in the camera and is received by said slot; one arm of said lever being pressed under spring effect against said pressure plate of the ram; the other arm of said lever having an end portion bent in a right angle relative to said other arm; two elongated flat slides, lying one upon another, being arranged on the bottom of the camera and having common guide means rendering them individually and together, respectively, slidably displaceable on the bottom of the camera; both ends of the lower slide having upward bent end portions; the upper slide having an elongated opening partly coinciding with two spaced openings provided in the lower slide; the upper slide, as well as the lower slide being permanently urged by spring effect in the direction of said ram plate and the right angle portion of said other arm of the two-armed lever; one end of the upper slide having a projection provided with a hook for engaging a locking means arranged on the camera cover; said double-armed lever being pressed by the camera cover into the camera, upon closing the camera, whereupon the cover is held in closed position; the camera being adapted to be opened upon exerting pressure on the release key and its pin, said pressure being transmitted over said balls, ram and ram plate to said double-armed lever which is thus caused to swing, whereby said right angle bent end portion of this lever engages said upper slide and causes it to move away from the ram plate against said spring effect acting on the slides, the hook engaging the locking means of the camera cover being thus removed from this engagement and releases the camera cover.

5. A release system as claimed in claim 4, in which upon depressing the release key, after release of the shutter pressure is exerted on the double-armed lever, over the balls, ram and ram plate, said double-armed lever acting on the lower slide and causes displacement of the latter, and said lower slide acts in turn on the film transport lock in order to release the film transport.

References Cited in the file of this patent
UNITED STATES PATENTS

| | | |
|---|---|---|
| 2,139,759 | Lindenberg | Dec. 13, 1938 |
| 2,478,394 | Harvey | Aug. 9, 1949 |

FOREIGN PATENTS

| | | |
|---|---|---|
| 267,601 | Great Britain | Mar. 17, 1927 |
| 711,814 | Germany | Oct. 7, 1941 |